June 20, 1967 SUSUMU ENAMI 3,327,218
COMBINED FREQUENCY AND AMPLITUDE MODULATION RECEIVERS
Filed March 13, 1963
Fig. 1
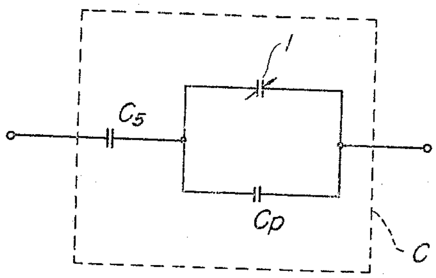
Fig. 2b
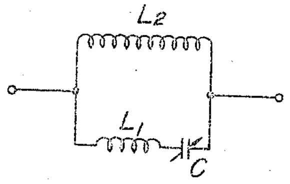
Fig. 2a
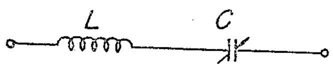
Fig. 2c
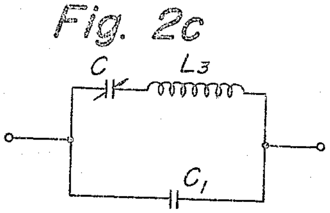
Fig. 2d
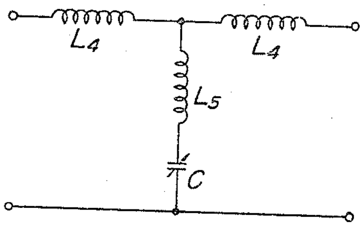
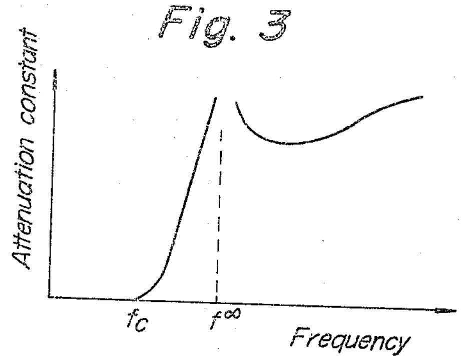
Fig. 4a
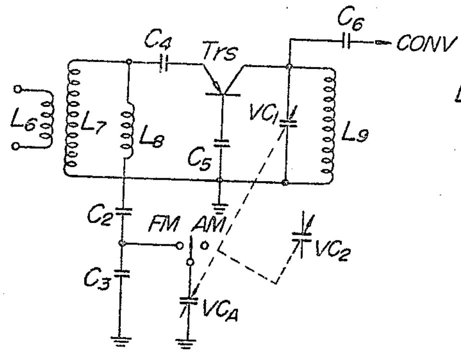
Fig. 4b
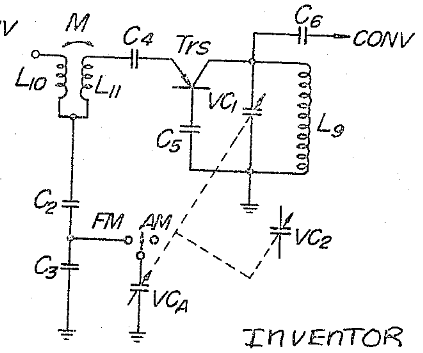
INVENTOR
Susumu Enami
By: Paul M. Craig, Jr.
ATTORNEY 3,327,218

COMBINED FREQUENCY AND AMPLITUDE MODULATION RECEIVERS

Susumu Enami, Yokohama, Japan, assignor to Hitachi, Ltd., Tokyo, Japan, a corporation of Japan Filed Mar. 13, 1963, Ser. No. 264,900
Claims priority, application Japan, Mar. 15, 1962, 37/9,658
3 Claims. (Cl. 325—315)

The present invention relates to combined frequency- and amplitude-modulation receivers and more particularly to those of the superheterodyne type including ganged FM and AM variable capacitors.

Superheterodyne receivers have had an inherent deficiency in that they involve interference by the image signal necessitating a receiving network adapted to give a satisfactorily high ratio of image-signal rejection.

Thus, in the past it has been difficult to obtain a satisfactory ratio of image-signal rejection (which will be referred to hereinafter as image ratio) with FM receivers for VHF band. With these receivers, the image ratio is determined by the frequency characteristics of the stages preceding the frequency converter and particularly of the parallel LC resonant network. In case the resonant network is formed in two or more stages including two or more ganged variable elements, the image ratio obtained may be nearly satisfactory but at the same time various difficulties are involved including increase in cost, difficulty in tracking alignment and adverse effects of the feedback through elements. Accordingly, it is desired to obtain an improved image ratio with a single-stage resonant network. To attain this objective, it is necessary to increase the Q factor of the resonant network so that a large impedance is obtained. However, it is difficult to increase the Q factor of the coil used in the VHF band to a satisfactory extent. Additional impedance obtained by the insertion of such coil in a resonant network is limited and the value of the Q factor when loaded is reduced more than expected. Even if the on-load Q factor is increased by some means or other, it has been extremely difficult to obtain a desired image ratio over the entire receiving frequency band because of the tracking error causing reduction in sensitivity and image ratio.

In general, frequency-modulation receivers have included therein an amplitude-modulation section for the medium- and short-wave band reception. In such cases, it is common practice to employ separate variable capacitors for the FM and AM receptions, respectively, which are ganged together for tuning purposes. The reason for this is that the ratio of the highest to the lowest receiving frequency of the FM broadcast band is smaller than that of the AM broadcast band and that the FM broadcasting frequency band is higher than the AM frequency band. Under these circumstances, the variable capacitor for AM reception remains idle during the FM reception having nothing to do therewith.

Accordingly, the present invention has for its object to provide a superheterodyne receiver for FM and AM reception which is free from the above difficulties having an improved image ratio. This objective can be attained according to the present invention by utilizing the variable capacitor for AM reception, which has heretofore been idle during reception of the FM broadcast, to also participate in the tuning of the receiver during FM reception.

According to the present invention, a frequency- and amplitude-modulation superheterodyne receiver including ganged variable capacitors for reception of frequency- and amplitude-modulation broadcasts, respectively, comprises an image-signal rejecting network including said variable capacitor for amplitude-modulation reception arranged so as to serve also as an element of said network upon the receiver being set for reception of the frequency-modulation broadcast.

The foregoing and other objects, features and advantages of the invention will become apparent from the folowing description when taken in conjunction with the accompanying drawings, which illustrate a few embodiments of the invention and in which:

FIG. 1 is a schematic diagram of one form of compound variable capacitor usable in the receiver of the present invention;

FIGS. 2*a*, 2*b*, 2*c* and 2*d* are schematic diagrams illustrating respective circuit arrangements employing the compound variable capacitor as shown in FIG. 1;

FIG. 3 is a graphical representation of the attenuation characteristics of the circuit shown in FIG. 2*d*; and FIGS. 4*a* and 4*b* are circuit diagrams of different forms of the frequency- and amplitude-modulation receiver embodying the present invention.

The superheterodyne receiver of the invention includes ganged variable capacitors, one of which serves for AM reception and is arranged so as to serve as an element of a trap circuit for rejecting the image signal away from the desired signal thereby to increase the image ratio upon the receiver being set for reception of the FM broadcast. As indicated hereinbefore, the variable capacitor for AM reception has a considerably large ratio of the maximum to the minimum capacity value as required to serve its purpose and thus cannot be conformed to the tuning characteristics of the FM band. However, it has been found that even the variable capaciotr for AM reception may have substantially the same capacity variation as one for FM reception by arranging capacitors $C_s$ and $C_p$ in series and in parallel, respectively, with the variable capacitor 1 for AM reception to form a compound variable capacitor as indicated by a block C in FIG. 1, as long as the capacitances of $C_p$ and $C_s$ are properly selected.

The compound variable capacitor C of FIG. 1 is usable as an element of the resonant or filter network of the receiver. In the resonant network, the capacitor C is arranged to give rise to series resonance at the image frequency to ground the image signal. In the filter network, on the other hand, it is arranged to cut off the image signal. Some examples of the resonant and filter networks including such compound variable capacitor C are illustrated in FIGS. 2*a*, 2*b*, 2*c* and 2*d*, respectively. In these figures, reference characters L, $L_1$, $L_2$, $L_3$, $L_4$ and $L_5$ all designate as inductor.

The series resonant circuit of FIG. 2*a* may be arranged in parallel with the transmission path for the FM signal so as to resonate at the image-signal frequency thereby to attenuate the image signal to a substantial extent. However, such circuit arrangement also has a substantial attenuating effect upon the desired signal being received and thus is of little value in practical applications. This deficiency can be obviated by use of any of the networks shown in FIGS. 2*b*, 2*c* and 2*d*. The impedance $Z_b$ of the two-terminal network of FIG. 2*b* is expressed by the formula:

$$Z_b=\frac{j\omega L_2(1-\omega^2 L_1 C)}{1-\omega^2(L_1+L_2)C}$$

The impedance $Z_c$ of the two-terminal network of FIG. 2*c* is expressed by the formula:

$$Z_c=\frac{1-\omega^2 L_3 C}{j\omega(C+C_1)\left(1-\omega^2 L_3\frac{CC_1}{C+C_1}\right)}$$

In the network of FIG. 2*b*, parallel resonance occurs at a certain frequency and series resonance at higher frequencies. On the other hand, the network of FIG. 2*c* undergoes series resonance at a frequency lower than its parallel resonance frequency. It will be recognized from the foregoing that the receiver may be arranged to cause parallel resonance at the signal frequency and series resonance at the image frequency by employing the network of FIG. 2*b* or FIG. 2*c* depending upon whether the local oscillator frequency of the receiver is higher or lower than the signal frequency.

FIG. 2*d* illustrates an application of the compound variable capacitor C to a derived-m low-pass filter. The design and characteristics of this type of filter are well known. Particularly, it attenuation characteristic curve is very steep at the cutoff, as shown in FIG. 3, and the loss in the pass band is limited. The design of the filter is determined by giving its nominal impedance $Z_n$, cutoff frequency $f_c$ and pole frequency $f_\infty$. In the case of the network of FIG. 2*d*, $f_\infty$ as well as $f_c$ varies with the variation in capacitance C. Accordingly, it will be understood that a satisfactory image ratio may be obtained over the entire receiving frequency range by properly selecting the circuit constants to arrange the signal and image frequencies in the pass and attenuation bands, respectively.

The derived-m low-pass filter as shown in FIG. 2*d* can only be employed in the case where the local oscillator frequency is on the upper side of the signal frequency to be received. On the other hand, the same effect may readily be obtained with the local oscillator frequency on the lower side of the signal frequency by the use of a derived-m high-pass filter.

FIGS. 4*a* and 4*b* illustrate the essential parts of transistorized frequency- and amplitude-modulation superheterodyne receivers including the above-image signal rejecting network. In these embodiments of the present invention, reference characters $C_2$ and $C_3$ designate series and parallel capacitors, respectively, employed to impart to the variable capacitor $VC_A$ for AM reception capacity-variation characteristics approximate to those of the variable capacitor for FM reception; $C_4$, an input coupling capacitor; $C_5$, a bypass capacitor; $C_6$ a coupling capacitor for connection to the frequency converter, not shown; $VC_1$, a tuning capacitor for FM reception; $VC_2$, a variable capacitor for the FM local oscillator; $L_6$, an antenna coil; $L_7$ and $L_8$, input coupling inductors, the values of which are each determined by the capacitances of $C_2$, $C_3$ and $VC_A$ so as to obtain parallel resonance at the reception frequency and series resonance at the image frequency; and $L_{10}$ and $L_{11}$, inductors having a mutual inductance M for forming a derived-m filter. It should be noted that the remaining parts of the AM portion of the receiver are not shown since they are entirely conventional and operate in accordance with known principles upon the receiver being switched to its AM operating mode.

With the image-signal rejecting network according to the present invention, it has been found that an image ratio of at least 30-odd decibels and, if various constants are properly selected, even of not less than 60 decibels can be obtained whereas with previous receivers of the type described the highest possible range of image ratio has been from 20 to 30 decibels.

While particular embodiments of the invention have been shown and described, it is apparent that changes and modifications may be made without departing from the invention in its broader aspects. The aim of the appended claims, therefore, is to cover all such changes and modifications as fall within the scope of the invention.

What is claimed is:

1. A combined frequency- and amplitude modulation superheterodyne receiver including variable capacitor means for FM reception and variable capacitor means for AM reception capable of being ganged with the variable capacitor means for FM reception, characterized in that the input circuit to an RF amplifying circuit of the receiver comprises resonant circuit means including first and second additional capacitor means, said resonant circuit means being resonant at an undesired image signal frequency and serving to short the undesired image signal, and means for connecting said variable capacitor means for AM reception in parallel with said first additional capacitor means and further in series with said second additional capacitor means during the FM operating mode such that composite capacitance of all of the capacitive elements defining resonant frequency of said resonant circuit means including the variable capacitor means for AM reception forms the variable capacitor means for FM reception.

2. A combined frequency- and amplitude modulation superheterodyne receiver including variable capacitor means for FM reception and variable capacitor means for AM reception capable of being ganged with the variable capacitor means for FM reception, characterized in that the input circuit to an RF amplifying circuit of the receiver comprises a derived-m type filter circuit having a pass band which corresponds to the desired reception band of the receiver and having an attenuation pole frequency substantially the same as an undesired image signal frequency, said filter circuit including first and second additional capacitor means, and means for connecting said variable capacitor means for AM reception in parallel with said first additional capacitor means and further in series with said second additional capacitor means during the FM operating mode such that the composite capacitance of all of the capacitive elements defining the attenuation pole frequency of said filter circuit including the variable capacitor means for AM reception forms the variable capacitor means for FM reception.

3. A combined frequency and amplitude modulation superheterodyne receiver including variable capacitor means for FM reception and variable capacitor means for AM reception ganged with the variable capacitor means for FM reception, the improvement wherein the variable capacitor means for AM reception comprises a part of the variable capacitor means for FM reception and wherein the receiver further comprises resonant circuit means including additional capacitor means which in conjunction with the AM variable capacitor means resonates at an undesired image signal frequency to reject the image signal, and switching means for connecting said variable capacitor means for AM reception in circuit relationship with said additional capacitor means during the FM operating mode, such that the resulting composite capacitance of the resonant circuit means including the variable capacitor means for AM reception forms the variable capacitor means for FM reception.

References Cited

UNITED STATES PATENTS 2,561,087 7/1951 Anderson ---------- 325—315

KATHLEEN H. CLAFFY, *Primary Examiner.*

R. S. BELL, *Assistant Examiner.*